United States Patent [19]

Streater

[11] Patent Number: 4,633,157
[45] Date of Patent: Dec. 30, 1986

[54] CONTROL SYSTEM FOR PERMANENT MAGNET SYNCHRONOUS MOTOR

[75] Inventor: August L. Streater, Bluffton, Ind.

[73] Assignee: Franklin Electric Co., Inc., Bluffton, Ind.

[21] Appl. No.: 644,333

[22] Filed: Aug. 27, 1984

[51] Int. Cl.$^4$ .............................................. H02P 5/40
[52] U.S. Cl. .................................. 318/723; 318/702; 318/722
[58] Field of Search .............. 318/702, 798, 805, 806, 318/693, 723, 722, 721

[56] References Cited

U.S. PATENT DOCUMENTS

| | | | |
|---|---|---|---|
| 3,546,551 | 12/1970 | Risberg et al. | 318/805 |
| 3,753,063 | 8/1973 | Graf | 318/806 |
| 3,935,518 | 1/1976 | Yusuk et al. | 318/805 |
| 4,112,339 | 9/1978 | Lipo | 318/798 |
| 4,511,834 | 4/1985 | Studmann | 318/722 |

OTHER PUBLICATIONS

Murphy, J. M. D., *Thyristor Control of A.C. Motors*, Pergamon Press, 1973, pp. 101–103.

*Primary Examiner*—David Smith, Jr.
*Attorney, Agent, or Firm*—Marshall, O'Toole, Gerstein, Murray & Bicknell

[57] ABSTRACT

This disclosure relates to a system for stabilizing a permanent magnet synchronous motor that does not have a rotor starting cage or windings. The system includes a dc source, an inverter connected to the dc source for converting the dc to a multi-phase ac, and an ac synchronous motor connected to receive the multi-phase ac, the motor being constructed without a starting cage or winding. The system further includes means for sensing variations in the motor power angle, and a control circuit connected to respond to the variations and to cause the inverter output to vary such as to generate an ac component of torque that leads in phase the power angle variations at the natural frequency of the rotor of the motor. The inverter output may be varied by modulating the applied frequency, the dc bus current to the inverter, or the inverter phase angle.

17 Claims, 5 Drawing Figures

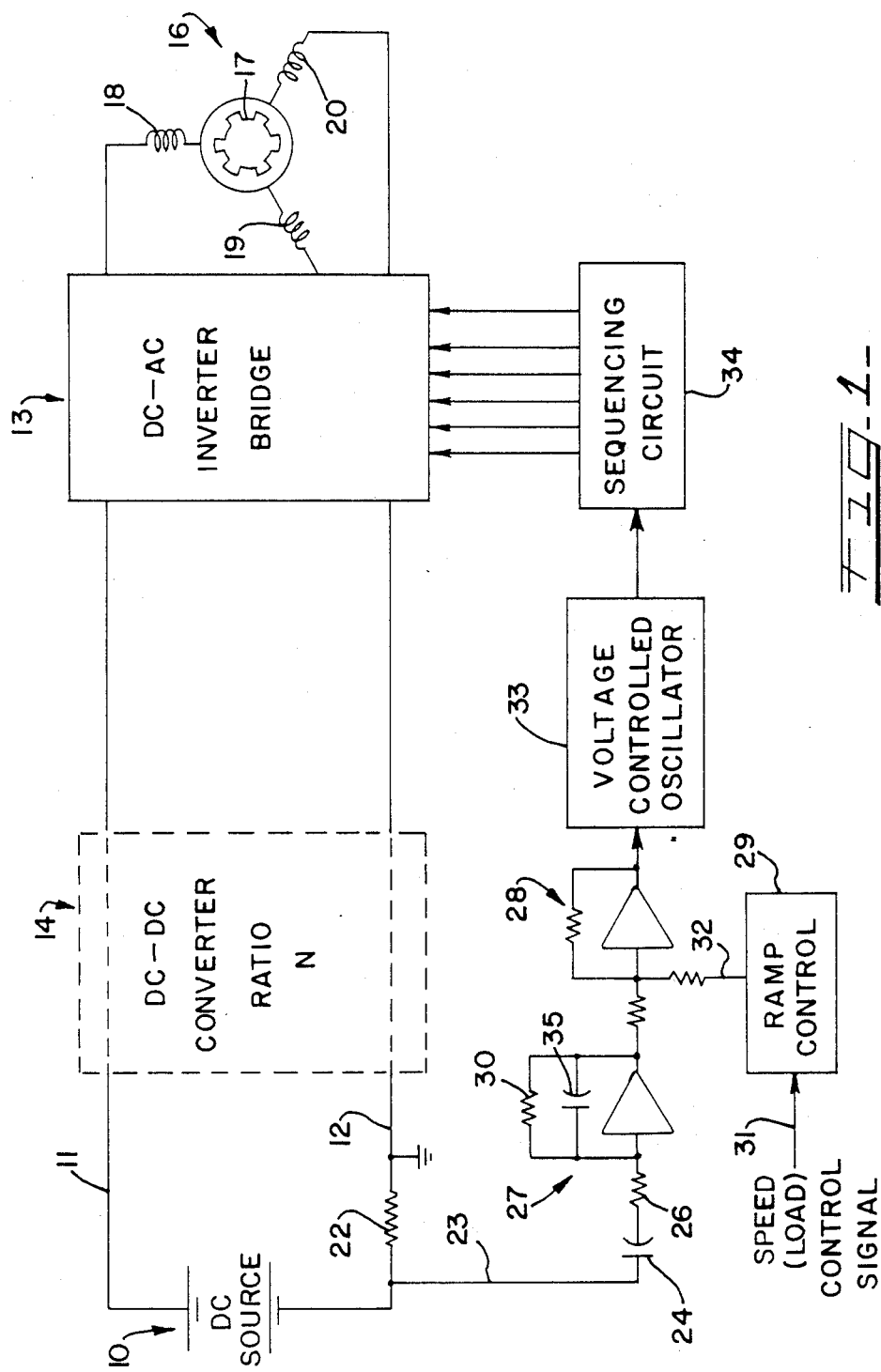

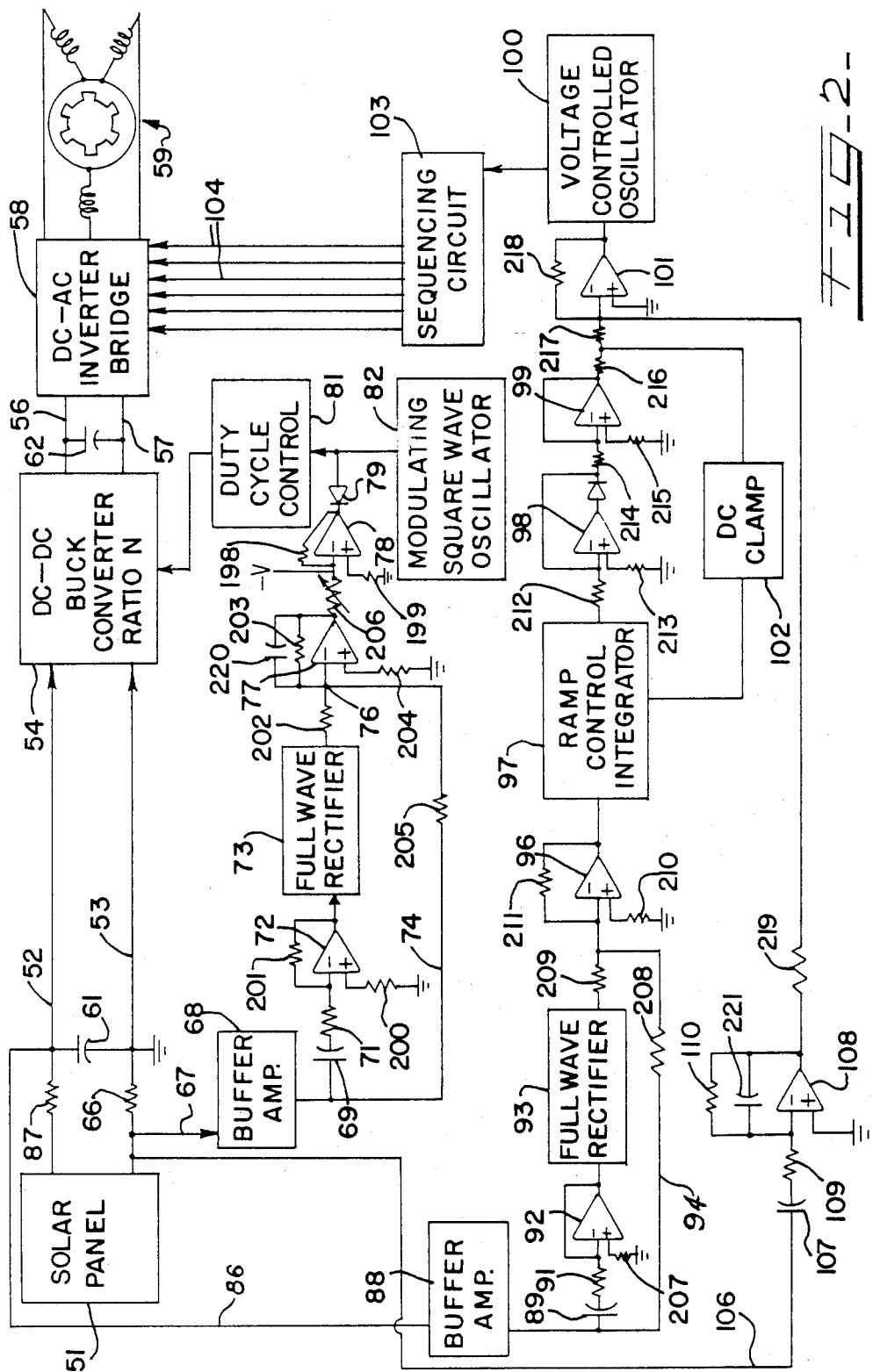

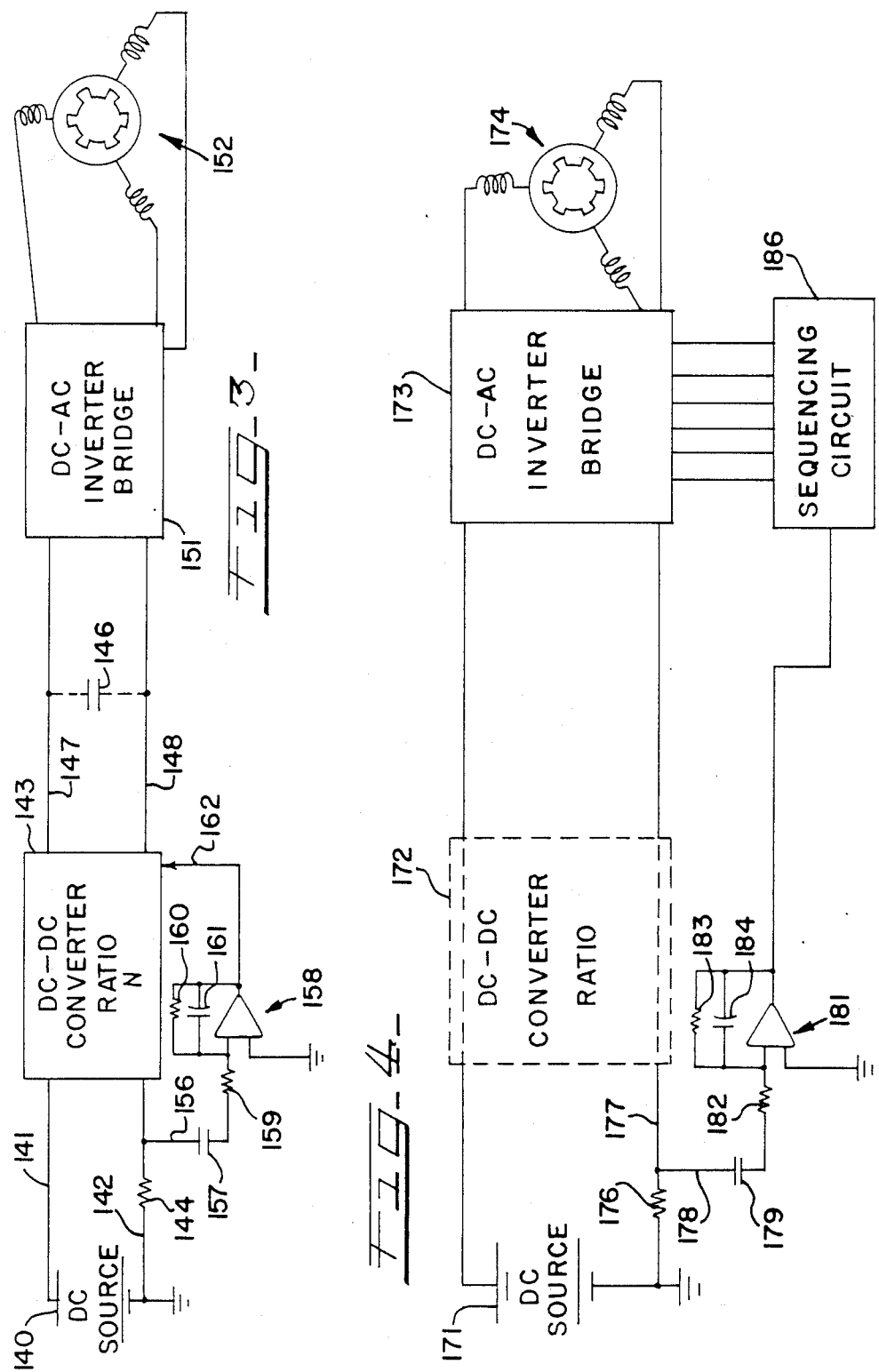

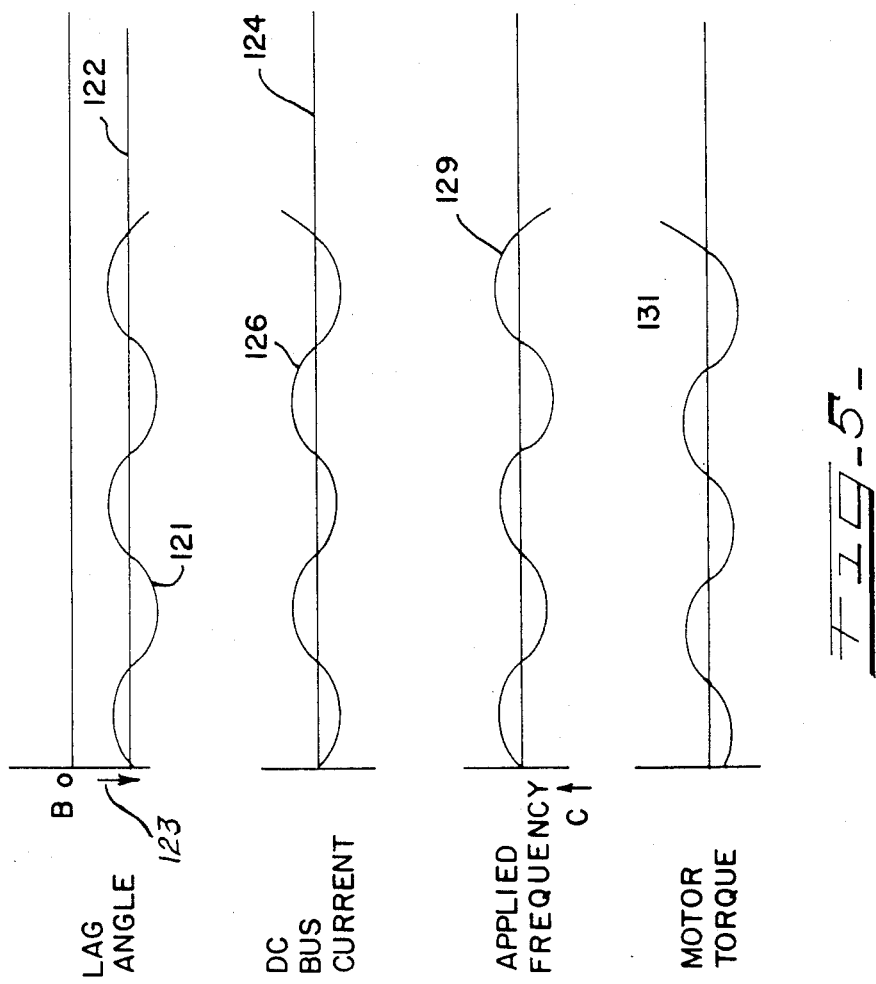

CONTROL SYSTEM FOR PERMANENT MAGNET SYNCHRONOUS MOTOR

BACKGROUND OF THE INVENTION

This invention relates to a drive or power system for a permanent-magnet (PM) synchronous motor. In recent years, such systems including dc to ac inverters have become increasingly important, and this interest has been due in part to improved magnetic materials for the permanent magnet rotors and to the reduced costs of solid state switching devices. Such a system has important characteristics that make them highly advantageous in some applications. For example, they are very efficient, simple in construction and dependable, capable of being powered by a dc source such as a solar array, and variable in speed so that the power output may be matched to the available power from the source.

In the past, synchronous motors have normally included a rotor starting cage or windings that are used to bring the motor up to or near synchronous speed. It is, however, desirable to be able to avoid the use of such a cage because it introduces harmonic losses during operation and, of course, a cage requires added expense. To operate such a motor without a starting cage, it is necessary to bring the motor up to rated speed by increasing the applied frequency from a low value to the normal value at a rate sufficiently low that the motor can remain in synchronism with the applied frequency.

However, it has been found that a PM synchronous motor without a starting cage, as described, is not stable except at the lower portion of a typical speed range. Ideally the rotor would turn at a uniform speed which is a function of the number of magnetic poles and the inverter applied frequency, but it has been found in practice that the rotor speed actually oscillates at its natural or harmonic frequency about the equilibrium speed. Such oscillations may be compared with the vibrations of a torsion spring at its harmonic frequency. When such a motor is started at a low speed and the speed is increased by increasing the applied frequency, the motor is stable (i.e., the oscillations are damped) until it reaches approximately one-fourth its rated speed, and then it becomes unstable. At this point the magnitude of the oscillations increases to the point where the rotor drops out of synchronism and then the motor stops. The speed at which this occurs depends on the motor construction and the type of load, and the motor and the load have inherent damping constants which prevent instability up to a certain point.

Three phase synchronous motors have, of course, been successfully operated in the past, and it is believed that such motors did not have such instability problems because they included either a starting cage or a starting motor, which functioned to damp such oscillations.

U.S. Pat. No. 3,753,063 of C. E. Graf describes a stabilizing system for damping speed oscillations of a three phase a-c reluctance-synchronous motor. According to this patent, the speed oscillations produce an a-c ripple current in the d-c bus supplying the inverter. The Graf patent describes a system for sensing the ripple current and modulating the inverter output voltage to counteract the oscillations. According to the patent, the modulation is such that an increase in rotor speed must result in an increase in the inverter output voltage, and vice versa. The precise construction of the a-c reluctance-synchronous motor is not clear from this patent, but the modulation system described in this patent would destabilize, not stabilize, a permanent magnet synchronous motor of the construction described herein.

BRIEF SUMMARY OF THE INVENTION

A system in accordance with the present invention includes a dc source, an inverter connected to the dc source for converting the dc to a multi-phase ac, and an ac synchronous motor connected to receive the multi-phase ac, the motor being constructed without a starting cage or winding. The system further comprises sensing means connected to the dc input of the inverter for sensing an ac component of the dc supply current, and a control circuit connected to respond to the ac component and to cause the inverter output to vary such as to generate an ac component of torque that leads in phase the ac component of the dc supply current at the natural frequency of the rotor of the motor.

BRIEF DESCRIPTION OF THE DRAWINGS

The invention may be better understood from the following detailed description taken in conjunction with the accompanying figures of the drawings, wherein:

FIG. 1 is a block diagram showing a system in accordance with this invention wherein the applied frequency is modulated;

FIG. 2 is a diagram showing a preferred frequency modulated system in accordance with the invention;

FIG. 3 is a block diagram showing a system in accordance with the invention wherein the dc voltage is modulated;

FIG. 4 is another block diagram showing a system in accordance with the invention wherein the phase angle is modulated; and FIG. 5 shows waveforms illustrating the operation of the system.

DETAILED DESCRIPTION OF THE DRAWINGS

With reference to FIG. 1, a dc source 10 is connected by dc buses 11 and 12 to the input of ac-ac inverter bridge 13 which may be a six-step inverter. A dc-dc converter 14 having a voltage ratio N may be connected in the buses 11 and 12 in order to supply the desired dc voltage level to the inverter 13. The output of the inverter 13 is connected to a synchronous motor 16 having a permanent magnet rotor 17 and three armature windings 18–20. The foregoing components may have conventional constructions. The motor 16 does not include a rotor starting cage or start windings.

The inverter 13 supplies three-phase current to the motor 16, causing the rotor 17 to rotate at a running speed which is a function of the inverter applied frequency and the number of rotor poles. The inverter frequency is controlled by a ramp control, and at motor startup the frequency is gradually increased from a low value. The ramp control also ensures that any change in frequency, and therefore motor speed, is not so abrupt that the motor speed cannot follow the frequency; if this were to occur, the motor would pull out of synchronism and stop.

In addition to rotating at this running speed, the rotor also oscillates at its natural harmonic frequency about the running speed. As will be described hereinafter, it has been found that when the motor speed is increased from a low speed, it tends to become unstable at approximately 25% of its rated speed. At this speed the oscillations increase to such an extent that the rotor is pulled out of synchronism with the rotating field, and the rotor then comes to a stop. The circuits to be described herein prevent such instability from occurring.

The oscillations of the rotor, as described, introduce an ac component in the dc current flowing in the dc buses 11 and 12. The circuit shown in FIG. 1 includes a shunt resistor 22 connected in the bus 12, and a sensor conductor 23 which is connected to one side of the resistor 22. A voltage appears on the sensor conductor 23 which is representative of the bus current and has both a dc component and an ac component. A capacitor 24 blocks the dc component, and the ac component is fed through an input resistor 26 of an inverting op amp circuit 27 which also includes a feedback resistor 30 and a capacitor 35 that bypasses high frequency noise. The op amp 27 inverts the voltage representing the ac bus current. The output of the op amp 27 is fed to an input of a voltage summing op amp 28. The latter op amp 28 also receives a control voltage signal from a ramp control circuit 29, which receives a control signal on a line 31. The control signal is placed on the input 31 by any desired control circuit (which may be conventional and is not shown in FIG. 1), and the ramp control 29 (which may also be conventional) adjusts or controls the rate of variation of the ramp voltage at its output 32. As previously mentioned, if the ramp voltage were to change too sharply, the motor speed may not be able to follow the sharp frequency change, and consequently, the function of the ramp control 29 is to ensure that the ramp voltage at the output 32 does not change at a faster rate than the motor can follow. The cyclically varying, inverted voltage signal from the op amp 27, and the relatively steady voltage signal from the ramp control 29 are combined by the summing op amp 28 and fed to the control input of a voltage controlled oscillator 33, the output frequency of which is a function of the input voltage level. The output frequency of the oscillator 33 controls a sequencing circuit 34 which has its output connected to control the switching of the inverter bridge 13. The gain of the op amp 27 is the ratio of the resistor 30 to the resistor 26 and these values are selected so that the amplitude of the modulating signal introduces a damping constant that is sufficient to stabilize the motor.

Thus, the applied frequency of the three-phase power output of the bridge 13 is controlled by the signal on the input of the oscillator 33, which consists of a relatively steady voltage from the ramp control 29 modulated by the inverted sinusoidal signal representing the ac component of the dc bus current. Consequently the inverter output frequency is modulated at the frequency of the ac component of the dc bus current (which is also the natural harmonic frequency of the rotor 17), and this frequency modulation produces an ac component of motor torque that leads in phase the ac component of the dc bus current. In order to achieve this desired phase relationship, it is essential that an increase in current at the shunt resistor 22 causes a decrease in the frequency of the inverter 13. The frequency modulation as described produces a damping constant that is added to the motor and load damping constants, and the total stabilizes the motor.

The system shown in FIG. 1 may include the dc-dc converter 14 to provide an essentially constant volts per hertz ratio, but it should be understood that the converter 14 may be eliminated and the source 10 connected directly to the inverter 13. If the converter 14 is provided, the shunt resistor 22 and the sensor line 23 could be connected between the converter 14 and the inverter 13.

The system shown in FIG. 2 is a specific example of a frequency modulated stabilization system and is the preferred embodiment of the invention. In the system shown in FIG. 2, the dc source comprises a solar array or panel 51. The panel 51 is connected by dc buses 52 and 53 to a dc-dc buck converter 54 having a voltage ratio N. The output of the converter 54 is connected by dc buses 56 and 57 to the input of a dc-ac inverter bridge 58, the bridge 58 having its output connected to a permanent magnet synchronous motor 59 that does not have a starting cage. The components 51, 54, 58 and 59 correspond to the components 10, 14, 13 and 16, respectively, shown in FIG. 1.

In addition, a capacitor 61 is preferably connected across the buses 52 and 53 and another capacitor 62 is preferably connected across the buses 56 and 57.

The motor stabilization control system in accordance with the present invention is shown in conjunction with a control circuit for containing optimum power transfer from the source 51 to the motor 59. The optimum power transfer control system is similar to the systems described in detail in the A. L. Streater et al. copending application Ser. No. 557,070, filed Dec. 2, 1983 and entitled "Electrical Power Matching System". The disclosure of the foregoing application is incorporated herein by reference. The power matching system shown in FIG. 2 includes a shunt resistor 66 connected in the bus 53 and a sensor line 67 connected between the panel 51 and the resistor 66. A voltage proportional to the bus current appears on the line 67 and is passed through a buffer amplifier 68. The current representative signal is passed through a capacitor 69 and a resistor 71 to another amplifier 72 and a full-wave rectifier 73. The capacitor 69 blocks the dc component of the signal so that only the ac component is amplified and rectified. The dc component is passed through a parallel line 74, and the two voltage signals are combined at a junction 76 which is connected to an input of a summing op amp 77. As described in the copending Streater et al. application, the ac component is amplified by a predetermined amount in comparison with the dc component, and the sum of the two components is amplified in the amplifier 77. The resulting voltage signal is passed through another amplifier 78, a diode 79 and to a square wave oscillator 82. The voltage signal at the output of the amplifier 78 biases the diode 79, and thereby forms with diode 79 a voltage level clamp on the output level of the square wave oscillator 82, in order to vary its output level in accordance with the level of the ac component of current in shunt 66. The oscillator 82 in turn is fed to a conventional duty cycle control 81 for the converter 54. The converter 54 is a buck converter wherein the voltage ratio N is controlled or varied by adjusting the duty cycle of the converter, and the component 81 provides this adjustment. The result is that the ratio N is modulated at the frequency of the oscillator 82 and by an amount that is a function of the ac component of the bus current in the line 53, as described in the Streater et al. application Ser. No. 557,070.

The dc voltage at the output of the solar panel 51 is also sensed and utilized as part of the control. A sensor line 86 is connected to the bus 52, and a resistor 87 is shown connected in the bus 52 between the panel 51 and the sensor line 86 to represent the internal ac resistance of the panel. The voltage signal appearing on the line 86 is passed through a buffer amplifier 88 to a capacitor 89, resistor 91, amplifier 92, and rectifier 93, similar to the arrangement for handling the ac component of the dc current. The ac component passes through the amplifier 92 and the rectifier 93, whereas the dc component of the bus voltage signal passes through a branch or parallel line 94, and the two voltage signals are summed by an amplifier 96. The output of the amplifier 96 is passed to a ramp control integrator circuit 97, which forms part of the ramp control 29 shown in FIG. 1. The signal output of the amplifier 96 corresponds to the signal on the line 31 in FIG. 1.

The output of the ramp control integrator 97 is fed to a zero clamp circuit 98, a polarity inversion circuit 99 and to a summing amplifier 101 which corresponds to the amplifier 28 in FIG. 1. A dc clamp circuit 102 is connected between the ramp control 97 and the connection between the circuits 99 and 101. The output of the summing amplifier 101 is connected to the control input of a voltage controlled oscillator 100 which has its output signal connected to a sequencing circuit 103. The circuits 100 and 103, of course, correspond to the circuits 33 and 34 in FIG. 1, and the sequencing circuit 103 has output lines 104 connected to the bridge 58.

The overall system further includes the system in accordance with this invention for adjusting the frequency of the inverter in order to stabilize the motor 59, as previously described. This portion of the system comprises a sensor line 106 that is connected to the dc bus 53 and corresponds to the line 23 in FIG. 1. The sensor line 106 is connected to a blocking capacitor 107 that passes the ac component but blocks the dc component, and the ac component is fed to an inverting op amp circuit 108 that corresponds to the circuit 27 in FIG. 1. The output of the op amp 108 is connected to the summing input of the amplifier 101, with the result that the frequency of the signal produced by the voltage controlled oscillator 100 is a function both of the inverted ac component of current in the dc bus 53, and the voltage signal from the ramp control.

The phase or polarity relationships are such that an increase in dc bus current at the shunt 66 results in a decrease in the frequency of the voltage controlled oscillator 102. This frequency modulation of the voltage controlled oscillator results in a corresponding frequency modulation of the dc-ac inverter bridge 58 driving the synchronous motor 59 and generates an ac component of torque that is in phase quadrature with and leads the ac components of both the dc bus current and the power angle. As will be shown and quantified by eq (4) and eq (5), this torque component provides positive damping to stabilize the motor.

As previously mentioned, the rotor oscillates at its natural or harmonic frequency about its equilibrium or steady state position relative to the rotating field. With reference to FIG. 5, the reference numeral 121 indicates a curve that represents the power angle B of the rotor. The power angle B may be defined as the angular displacement or lag of the rotor behind the rotating field. The power angle, which varies with torque, varies about the equilibrium angle 122 as previously mentioned at the natural frequency of the rotor. The arrow 123 indicates an increasing lag or power angle. The current in the bus 53 includes a steady dc component 124 and an ac component 126. The applied frequency is frequency modulated as indicated by the numeral 129, with the arrow C indicating an increase in applied frequency, and as a result the torque has an ac component 131 that leads the ac component 126 of the dc bus current.

Assuming that the harmonic frequency of the rotor is much less than the applied or output frequency of the inverter, it can be shown that the inherent damping constant C of a permanent magnet synchronous motor without a starting cage is given by the equation:

$$C_M = \frac{3(E/\omega_M)^2 R^3}{p(R^2 + \omega^2 L^2)^2}\left[1 - \left(\frac{\omega L}{R}\right)^2\right] \quad (1)$$

where
E is the rms fundamental component of the induced voltage of the motor;
R is the motor resistance per phase including the resistance of one transistor of the inverter bridge;
L is the motor inductance per phase (to neutral) and including the 3-phase coupling to the other phases;
p is the number of pole pairs;
$\omega$ is the rotor angular velocity in electrical radians per second; and
$\omega_M$ is the rotor angular velocity in mechanical radians per second.

From equation (1) it will be apparent from the bracketed quantity that when the winding reactance is less than the resistance, the damping constant is positive and the motor is stable. When the motor speed (and therefore the winding reactance) increases to the boundary speed where the reactance is greater than the resistance, the constant is negative and the motor is unstable.

A load coupled to the motor adds some damping only if the load torque increases with speed, as is the case with a centrifugal pump, for example. The load damping constant $C_L$ is given by the equation:

$$C_L = \frac{(n-1)p\, P_L(R)\, \omega^{(n-2)}}{[\omega(R)]^n} \quad (2)$$

where
$P_L(R)$ is the load power at $2\pi$ times the rated applied frequency $\omega(R)$; and $$P_L = P_L(R)\left[\frac{\omega}{\omega(R)}\right]^n$$

The load damping constant is added to the inherent motor damping constant, but it has been found that the sum has not been sufficient to stabilize the motor at speeds approaching rated speed. A system in accordance with this invention introduces an additional damping constant, which is algebraically added to the motor and load damping constants, by modulating the inverter applied voltage so as to generate an ac component of torque that leads the ac component of the dc supply current at the natural frequency of the rotor. As described in connection with FIGS. 1 and 2, the system shown therein modulates the frequency of the applied voltage to accomplish this function.

Assuming that the power angle B (curve 121) varies about the equilibrium point at the natural frequency of the rotor, the motor shaft torque (in Newton meters) may be given as $$T = \Delta B_m \epsilon^{-at}[(k-aC)\sin \omega_o t + \omega_o C \cos \omega_o t] \quad (3)$$

where $\Delta B_m$ is the peak angular oscillatory displacement of the rotor from equilibrium;

k is the torsional spring constant of the rotor (in Newton meters per radian);

a is given by $Cp/2J$ where C is the motor damping constant, p is the number of pole pairs and J is the rotational moment of inertia of the rotor and the load (in Kg meters$^2$); and $\omega_o$ is $2\pi$ times the natural or resonant frequency of the rotor and the load.

From equation (3) it will be noted that when the damping constant C is positive, the resulting torque leads the displacement angle B, whereas if the damping constant is negative, the resulting torque lags B. Furthermore, the magnitude of the damping constant is given by the peak value of the quadrature component of the torque divided by the peak angular displacement and $2\pi$ times the natural frequency, or:

$$C = \frac{\text{Torque in quad. with } \Delta B}{\omega_o \Delta B_m} \quad (4)$$

Where a dc-dc converter is provided and the dc current is sensed at the input of the converter as shown in FIG. 2, the damping constant $C_{FM}$ added by the frequency modulation of the applied voltage may be given as:

$$C_{FM} = \frac{2.7 \pi N K_F R_s (E/\omega M) \omega_v^2 L J R_2}{p^2 (R^2 + \omega_v^2 L^2) R_1} \left[ \cos B + \frac{R}{\omega_v L} \sin B \right] \quad (5)$$

where

N is the voltage ratio of the dc-dc converter;

$K_F = \Delta f/e_o$ in hertz per volt;

$R_s$ is the resistance of the shunt resistor 66;

$\omega_v$ is $2\pi$ times the fundamental frequency of the applied voltage; and $R_1$ and $R_2$ are the values of resistors 109 and 110 (FIG. 2).

In the instances where the shunt resistor 66 is at the input of the inverter 58 or where the dc-dc converter is not provided, the ratio N equals 1. Representative values of a specific example of the system shown in FIG. 2 are listed at the end of this specification.

FIG. 3 illustrates a system wherein the magnitude of the dc bus voltage is modulated, instead of the applied frequency of the inverter. A dc source 140 is connected by dc buses 141 and 142 to a dc-dc converter 143 having a voltage ratio N. A shunt resistor 144 is connected in the bus 142, and an output capacitor 146 is connected across the dc output buses 147 and 148. An inverter bridge 151 is connected to the buses 147 and 148, and a permanent magnet synchronous motor 152 receives the applied frequency of the inverter.

The converter 143 has a voltage ratio N and in this example it is a buck converter wherein the ratio N is varied by adjusting the duty cycle of the converter.

As discussed previously, the rotor of the motor 152 oscillates at its natural frequency. Thus, the power angle B, which is proportional to the motor torque, varies about an equilibrium value and lags the rotating field. The rotor oscillation produces an ac component in the current in the dc bus 142, and this ac current is sensed and utilized as an indirect measure of the varying power angle and the motor torque.

A sensor line 156 is connected to the bus 142, and a capacitor 157 blocks the dc current component. The ac voltage signal is fed to an integrating op amp 158 that includes resistors 159 and 160 and a capacitor 161. The output of the op amp 158 is fed to the duty cycle control input 162 of the buck converter 143 in order to modulate the converter output voltage, and the op amp 158 shifts the phase of the signal by approximately 90° relative to the ac current component and the motor torque. This phase shift produces, in effect, a capacitive output impedance of the converter at the natural frequency of the rotor, which causes the converter output voltage to vary in quadrature with the bus current. The converter output voltage modulated in this manner introduces a positive damping constant which is added to the motor and load constants, and is sufficient to maintain the total damping constant at a positive value. The phase shifted amplitude modulation of the converter output voltage again generates a quadrature component of torque that is proportional to $\delta T/\delta(dB/dt)$ and leads the power or displacement angle B and thereby stabilizes the motor.

With reference to FIG. 3, the damping constant $C_v$ produced by modulating the converter voltage is given by:

$$C_v = \frac{1.35(E/\omega_M) R J R_s \omega_v K_n}{p^2 R_1 C_2 (R^2 + \omega_v^2 L^2)} \left[ \cos B + \frac{\omega_v L}{R} \sin B \right] \left[ \frac{\cos B + R/\omega_v L \sin B}{\cos B - R/\omega_v L \sin B} \right] \quad (6)$$

where $R_s$ and $R_1$ are the values of resistors 144 and 159 and $C_2$ is the value of capacitor 161; and $K_n = \Delta N/e_o$ where $\Delta N$ is the variation in the voltage ratio and $e_o$ is the output voltage of the op amp 158.

The foregoing relation holds true when the undamped natural frequency $f_o$ is very much greater than $\frac{1}{2}\pi R_1 C_2$ and $\frac{1}{2}\pi R_2 C_2$ where $C_1$ and $C_2$ are the values of capacitors 157 and 161, and $R_1$ and $R_2$ are the values of resistors 159 and 160. The voltage ratio N of the converter is given by:

$$N = V_{out}/V_{in} = N_o + K_n e_o \quad (7)$$

where $N_o$ is the undamped voltage ratio of the converter.

FIG. 4 illustrates a system wherein the inverter phase angle is modulated to introduce a phase angle modulated damping constant $C_\gamma$. This system includes a dc source 171 connected to a dc-dc converter 172, a dc-ac inverter 173, and a PM synchronous motor 174 as previously described. The converter 172 may be deleted in some applications.

The stabilization system comprises a shunt resistor 176 connected in a dc bus 177, and a sensor line 178 connected across the resistor 176. A capacitor 179 blocks the dc current but passes the ac component, and the ac component is passed to a phase shifting op amp 181 that includes an input resistor 182, a feedback resistor 183, and a capacitor 184. The phase shifted output voltage is fed to a control input of a sequencing circuit 186 of the inverter 173.

The stabilization circuit modulates the inverter voltage phase angle utilizing a signal that is in quadrature with the ac component of the dc bus current (and consequently the power angle and the motor torque). The circuit advances or retards the turn-on and turn-off times of the inverter transistors by an amount that is proportional to the magnitude of the quadrature signal.

In a construction where the dc-dc converter 172 having a voltage ratio N is provided, the damping constant is given by:

$$C\gamma = \frac{N K_g R_s 1.35 (E/\omega_M)\omega_r^2 LJ}{p^2 R_1 C_2 (R^2 + \omega_r^2 L^2)} \left[ \cos B + \frac{R}{\omega_r L} \sin B \right] \quad (8)$$

where $K_g = \Delta\gamma/e_o$, and $\Delta\gamma$ is the change in the phase angle of the inverter output and $e_o$ is the output of the integrating op amp 181 for ac component of the dc bus current.

$R_s$ and $R_1$ are the values of the resistors 176 and 182, $C_2$ is the value of capacitor 184, and $f_o$ is much greater than $\tfrac{1}{2}\pi R_1 C_1$ and $\tfrac{1}{2}\pi R_2 C_2$, $R_2$ and $C_1$ being the values of resistor 183 and capacitor 179.

It will be apparent from the foregoing that a novel and improved motor stabilization system has been provided. The system operates to stabilize the motor through the power supply circuitry, thereby avoiding the need to modify the structure of the motor. The system senses the motor power angle and torque and controls the supply circuitry such as to generate an ac component of torque that leads in phase the motor torque. The ac current in the dc bus is sensed and utilized as a measure of the varying power angle and motor torque. The ac component of torque is generated by modulating the inverter applied frequency, or the dc bus voltage, or the inverter phase angle. In each embodiment the motor is stabilized from low speed to full rated speed.

| COMPONENTS SHOWN IN FIG. 2 | | | |
|---|---|---|---|
| Resistor 66: | .1 ohm | Capacitor 69: | .1 uf |
| 71: | 6.2 K ohm | 220: | 1.0 uf |
| 198: | 300 K ohm | 89: | .1 uf |
| 199: | 2.0 K ohm | 107: | 2.2 uf |
| 200: | 6.8 K ohm | 221: | .1 uf |
| 201: | 120 K ohm | | |
| 202: | 47 K ohm | All Op. Amps. are LM 324 | |
| 203: | 150 K ohm | | |
| 204: | 30 K ohm | Oscillator 82: | MC 1455 |
| 205: | 200 K ohm | 100: | MC 14046 BCP |
| 206: | 5 K ohm | | |
| 91: | 820 ohm | | |
| 207: | 5.6 K ohm | | |
| 208: | 180 K ohm | | |
| 209: | 33 K ohm | | |
| 210: | 15 K ohm | | |
| 211: | 27 K ohm | | |
| 212: | 1 K ohm | | |
| 213: | 1 K ohm | | |
| 214: | 1 K ohm | | |
| 215: | 1 K ohm | | |
| 216: | 100 ohm | | |
| 217: | 150 K ohm | | |
| 218: | 56 K ohm | | |
| 109: | 10 K ohm | | |
| 110: | 6.2 K ohm | | |
| 219: | 150 K ohm | | |

What is claimed is:

1. A stabilization system for a permanent magnet synchronous motor that does not include a rotor starting cage or winding and is unstable at above a boundary frequency, said boundary frequency being approximately the frequency where the motor reactance is substantially equal to the motor resistance, the motor being connected to a power supply including a dc source and an inverter between the source and the motor, the inverter producing an ac output voltage for powering the motor, and the motor during operation thereof having a power angle that is a function of the motor torque, said system comprising sensing means adapted to be connected to said supply for sensing any cyclical variations in the power angle, and control means connected to said sensing means and adapted to be connected to said supply for modulating the level of said ac output voltage and thereby generating an ac component of torque that leads in phase the power angle variations at the natural frequency of the rotor and stabilizes the motor at above said boundary frequency.

2. A system according to claim 1, wherein a dc bus connects the dc source with the inverter, the power angle variations producing an ac component in the current in the dc bus, and said sensing means is adapted to be connected to the dc bus, said sensing means sensing said ac component.

3. A stabilized motor system comprising a permanent magnet synchronous motor that does not include a rotor starting cage or winding, a power supply connected to power said motor and including a dc source and an inverter between the source and the motor, the inverter producing an ac output voltage for powering the motor, said rotor having a harmonic frequency which is substantially less than the frequency of said ac output voltage, said motor being unstable at above a boundary frequency where the motor reactance is substantially equal to the motor resistance, and the motor during operation thereof having a power angle that is a function of the motor torque, sensing means connected to said supply for sensing any cyclical variations in the power angle, and control means connected to said sensing means and connected to said supply for varying the inverter output to generate an ac component of torque that leads in phase the power angle variations at the natural frequency of said rotor and thereby stabilizing the motor at above said boundary frequency.

4. A system according to claim 3, and further including a dc bus connecting the dc source with the inverter, the power angle variations producing an ac component in the current in the dc bus, and said sensing means being connected to the dc bus, said sensing means sensing said ac component.

5. A system according to claim 3, wherein said control means modulates the frequency of said ac output voltage.

6. A system according to claim 3, wherein said control means modulates the voltage level of said ac output voltage.

7. A system according to claim 3, wherein said control means modulates the phase of said ac output voltage.

8. In a motor system including a permanent magnet synchronous motor which is subject to instability when operated at above a boundary speed, said boundary speed being at the frequency where the motor reactance is substantially equal to the motor resistance, said instability resulting in oscillatory variations in the power angle of the motor, an inverter producing an ac output voltage connected to power said motor, said motor including a rotor having a harmonic frequency which is substantially less than the frequency of said ac output voltage, a dc source, a dc bus connecting said dc source with said inverter, said power angle variations resulting in an ac current component on said dc bus, the improvement of a circuit for avoiding said instability, said circuit comprising sensing means connected to said dc bus and responding to said ac current component, adjusting means connected to receive said ac current component and connected to control said inverter for varying said ac output voltage to genrate an ac component of torque that leads in phase said ac current component at the natural frequency of said motor and thereby stabilizing the motor at above said boundary speed.

9. Apparatus according to claim 8, wherein said adjusting means modulates the frequency of said ac output voltage.

10. Apparatus according to claim 8, wherein said adjusting means modulates the phase angle of said ac output voltage.

11. Apparatus according to claim 8, wherein said system further includes a dc-dc converter connected in said dc bus between said source and said inverter, said adjusting means being connected to said converter and modulating the voltage level of said ac output voltage.

12. A stabilization system for a permanent magnet synchronous motor that does not include a rotor starting cage or winding and is unstable at above a boundary frequency, said boundary frequency being approximately the frequency where the motor reactance is substantially equal to the motor resistance, the motor being connected to a power supply including a dc source and an inverter between the source and the motor, the inverter producing an ac output voltage for powering the motor, and the motor during operation thereof having a power angle that is a function of the motor torque, said system comprising sensing means adapted to be connected to said supply for sensing any cyclical variations in the power angle, and control means connected to said sensing means and adapted to be connected to said supply for modulating the phase of said ac output voltage and thereby generating an ac component of torque that leads in phase the power angle variations at the natural frequency of the rotor and thereby stabilizing the motor at above said boundary frequency.

13. A system according to claim 12, wherein a dc bus connects the dc source with the inverter, the power angle variations producing an ac component in the current in the dc bus, and said sensing means is adapted to be connected to the dc bus, said sensing means sensing said ac component.

14. A motor system comprising a permanent magnet synchronous motor adapted to drive a load which may have a load damping constant, said motor having an inherent motor damping constant but being subject to instability when operated at above a boundary speed, said instability resulting in oscillatory variatons in the power angle of the motor, an inverter producing an ac output voltage connected to power said motor, said motor including a rotor having a harmonic frequency which is substantially less than the frequency of said ac output voltage, a dc source, a dc bus connecting said dc source with said inverter, said power angle variations resulting in an ac current component on said dc bus, and a circuit for producing an additonal damping constant which when added to said motor damping constant and any load damping constant acts to stabilize the motor at above said boundary speed, said boundary speed occurring approximately at the frequency where the motor reactance is equal to the motor resistance, said circuit comprising sensing means connected to said dc bus and responding to said ac current component, adjusting means connected to receive said ac current component and connected to control said inverter for varying said ac output voltage to generate an ac component of torque that leads in phase said ac current component at the natural frequency of said motor.

15. Apparatus according to claim 14, wherein said adjusting means modulates the frequency of said ac output voltage.

16. Apparatus according to claim 14, wherein said adjusting means modulates the phase angle of said ac output voltage.

17. Apparatus according to claim 14, wherein said system further includes a dc-dc converter connected in said dc bus between said source and said inverter, said adjusting means being connected to said converter and modulating the voltage level of said ac output voltage.

* * * * *